(12) United States Patent
Turrini et al.

(10) Patent No.: US 7,367,758 B2
(45) Date of Patent: May 6, 2008

(54) CERAMIC BIT FOR HIGH SPEED DRILLING

(75) Inventors: Claude Turrini, Ballancourt (FR); Alain Martinez, Corbeil Essonnes (FR); Veronique Zerrouki, Paris (FR)

(73) Assignee: Snecma, Paris (FR)

( * ) Notice: Subject to any disclaimer, the term of this patent is extended or adjusted under 35 U.S.C. 154(b) by 651 days.

(21) Appl. No.: 10/961,060

(22) Filed: Oct. 12, 2004

(65) Prior Publication Data
US 2005/0135889 A1 Jun. 23, 2005

(30) Foreign Application Priority Data
Oct. 16, 2003 (FR) .................................. 03 12065

(51) Int. Cl.
*B23B 51/02* (2006.01)
(52) U.S. Cl. .................. 408/230; 408/144; 408/1 R
(58) Field of Classification Search ................ 408/144, 408/227, 229, 230, 1 R; *B23B 51/02*
See application file for complete search history.

(56) References Cited
U.S. PATENT DOCUMENTS

| | | | |
|---|---|---|---|
| 2,778,252 A * | 1/1957 | Oxford, Jr. ................ 408/230 |
| 4,556,347 A * | 12/1985 | Barish ........................ 408/230 |
| 4,789,277 A | 12/1988 | Rhodes et al. |
| 4,898,503 A | 2/1990 | Barish |
| 4,983,079 A * | 1/1991 | Imanaga et al. ............ 408/230 |
| 5,230,593 A * | 7/1993 | Imanaga et al. ............ 408/230 |
| 5,423,640 A * | 6/1995 | Lindblom et al. .......... 408/230 |
| 5,590,987 A * | 1/1997 | Bouzounie .................. 408/230 |
| 5,641,251 A | 6/1997 | Leins et al. |
| 6,126,367 A * | 10/2000 | Reed .......................... 408/1 R |
| 6,739,809 B2 * | 5/2004 | Shaffer ....................... 408/230 |

FOREIGN PATENT DOCUMENTS

| EP | 0 936 014 A1 | 8/1999 |
|---|---|---|
| FR | 2 674 160 | 9/1992 |
| JP | 2000263306 A * | 9/2000 |

* cited by examiner

*Primary Examiner*—Daniel W. Howell
(74) *Attorney, Agent, or Firm*—Oblon, Spivak, McClelland, Maier & Neustadt, P.C.

(57) ABSTRACT

A ceramic drill bit comprising a cylindrical shank and a shaped portion extending axially in line with the shank and having a free end forming the tip of the bit, a relief face extending from each main cutting edge with a relief angle lying in the range 4° to 10° approximately relative to a plane perpendicular to the axis of rotation of the bit, and two notches forming two secondary cutting faces extending from the central edge with positive cutting angles lying in the range 1° to 7° approximately relative to the axis of rotation of the bit.

22 Claims, 2 Drawing Sheets

CERAMIC BIT FOR HIGH SPEED DRILLING

The present invention relates to a drill bit made of ceramic material. It finds a particular application in the field of aviation for very high speed drilling of very hard materials such as refractory materials, and in particular superalloys based on nickel and cobalt, e.g. Inconel 718, that are used in particular for manufacturing flanged parts for aviation applications.

BACKGROUND OF THE INVENTION

At present, because of their great hardness and ability to withstand high temperatures, ceramics are being used increasingly for making cutting tools. As a general rule, known ceramic cutting tools that enable high speed machining to be performed on very hard materials, such as those described in document EP-B1-0 477 093, are milling cutters and lathe tools. Unfortunately, the stresses that can be applied to a drill bit (drilling depth, swarf removal, intensity and direction of cutting forces) during a drilling operation are greater than those that might be applied, for example, to a lathe tool or to a cutter during a milling operation. These stresses make it more difficult to provide ceramic bits for drilling at very high speeds in very hard materials.

Numerous manufacturers propose ceramic drill bits in their catalogs, and document U.S. Pat. No. 5,641,251 describes one such bit. Although those bits provide improved performance compared with conventional bits made of high-speed steel or of tungsten carbide, they are limited in their utilizations and they do not enable very high speed drilling to be performed in materials as hard as superalloys. Because of the low toughness of ceramic materials, ceramic bits present lower torsional strength and compressive strength than metallic bits, e.g. made of tungsten carbide, with these mechanical characteristics causing ceramic bits to be brittle when drilling in hard materials or when drilling at high speeds of advance or at high cutting speeds. Work has been undertaken to improve the mechanical characteristics of ceramic-based materials: document U.S. Pat. No. 4,789,277 describes ceramics in which fibers (or whiskers) of silicon carbide (SiC) are introduced to improve their mechanical characteristics. In addition, it is known and recommended to ensure that the cutting edges of drill bits are always made with zero or negative angles so as to protect the cutting edges from wear, thereby increasing the lifetime of a ceramic bit.

Nevertheless, such bits are still of limited use in terms of the materials they can drill and of the cutting and advance speeds of the bits. When drilling materials as hard as refractory materials such as superalloys based, for example, on nickel and cobalt (having a Vickers hardness number of about 440) and when the cutting and advance speeds are very high, for example when the cutting speed is greater than about 400 meters per minute (m/min) and when the speed of advance is greater than 0.04 millimeters per revolution, the twisting and axial compression forces that are generated and applied to prior art bits are such that they will inevitably break. In addition, the cutting forces exerted by such bits on the workpieces to be drilled, and the friction between the radially-outer surfaces of the bits and the inner cylindrical surfaces of the drilled holes lead to thermal stresses in the bits and the workpieces to be drilled that cause accelerated degradation of the bits and deformation of the workpiece when attempts are made to drill at high speed in very hard materials.

In addition, with increasing depth of a hole being drilled, the twisting forces applied to ceramic bits become ever greater, firstly because there is an ever increasing outside area of the bit rubbing against the inner cylindrical surface of the drill hole, and secondly because when drilling at high speeds, prior art ceramic bits cannot evacuate a large quantity of swarf efficiently, thereby leading to clogging phenomena in the bit, and consequently increasing the twisting forces applied to the bit and increasing the risks of it breaking. These drawbacks generally make it impossible to drill holes at high speed to a depth that is greater than the diameter of the bit.

OBJECTS AND SUMMARY OF THE INVENTION

An object of the invention is to avoid the above-mentioned drawbacks and to provide a solution that is technically simple and inexpensive, that enables the performance of ceramic bits to be improved, and that enables hard materials to be drilled at very high speed.

To this end, the invention provides a ceramic drill bit comprising:

a cylindrical shank; and a shaped portion extending axially in line with the shank and having a free end forming the tip of the bit, the shaped portion being in the form of a truncated cone whose larger base is situated beside the tip of the bit, the tip comprising two main cutting edges and a central edge between the two main cutting edges, the shaped portion comprising two lips and two flutes extending in alternation around the axis of rotation of the bit, the lips and the flutes extending from the tip towards the shank, each lip including a land and each flute including a main cutting face adjacent to a land and to a main cutting edge, at least the shaped portion of the bit being made of ceramic material, the drill bit being wherein:

the cutting angle of the bit is positive;

a relief face extends from each main cutting edge at a relief angle lying in the range 4° to 10° approximately relative to a plane perpendicular to the axis of rotation of the bit; and two notches forming two secondary cutting faces extend from the central edge with positive cutting angles lying in the range 1° to 7° approximately relative to the axis of rotation of the bit.

In an embodiment, the lips and the flutes wind helically about the axis of rotation of the bit with a helix angle lying in the range 20° to 30° approximately, and preferably in the range 20° to 25° approximately relative to the axis of the bit.

In another embodiment, the taper angle of the shaped portion lies in the range 1° to 5° approximately, and preferably in the range 2° to 4° approximately.

In another embodiment, the width of each land is less than about one-tenth and preferably less than or equal to about one-twentieth of the outside diameter of the shaped portion.

Several advantages result from the combination of dimensional and geometrical characteristics in the drill bit of the invention.

One of these advantages is to reduce considerably the twisting forces and compression forces applied to the bit, thereby avoiding breakage or shear thereof while drilling at high speed in very hard materials such as superalloys based on nickel and cobalt. In order to reduce twisting forces without reducing the strength characteristics of the bit, various solutions have been adopted, one of which lies in the width of the lands, which width is limited in order to reduce the friction torque between the bit and the inner cylindrical wall of the drill hole. The taper of the shaped portion of the bit lying in the range 1° to 3° approximately also serves to reduce the friction torque between the bit and the wall of the drill hole, the lands then coming into contact with the inner cylindrical wall of the drill hole only in the vicinity of the tip of the bit. Contrary to the prior art practice in making ceramic bits, the cutting angles of the bit of the invention are positive, lying in the range 4° to 10° approximately relative to the axis of the bit, thereby reducing the cutting forces and consequently reducing the twisting forces exerted on the bit. In the prior art, cutting angles are zero or even negative in order to reduce wear on the cutting edges over time. Reducing cutting forces and friction between the bit and the walls of the drill hole also makes it possible to reduce the heat energy that is given off during a drilling operation, thus enabling drilling to be performed at high speed in materials that are very hard without damaging the bit or the workpiece.

The compression forces which are exerted on the bit while drilling are reduced by the two notches formed starting from the central edge of the ceramic bit. Conventional central edges of ceramic bits do not present any cutting angle, and consequently they oppose considerable resistance to axial displacement of a bit. The presence of notches makes it possible to modify the central edge so that it becomes a cutting edge having two positive cutting angles lying in the range 1° to 7° approximately relative to the axis of the bit.

In the invention and in order to reduce the risks of the bit breaking or shearing, the lips and the flutes are of a helical shape enabling the bit to better withstand the twisting forces which are applied thereto, without decreasing its other strength characteristics. The helical shape of the flutes having a helix angle of less than 25° makes it possible to ensure that swarf is evacuated well regardless of the cutting speeds and at drilling depths that can be greater than the outside diameter of the bit.

Contrary to that which might have been feared, the thermal stresses and the spoiling of material at the edge of the hole remain minor and limited to a depth of a few hundreds of micrometers (μm). The swarf produced takes on a red color as it leaves the hole, which means that its temperature is about 1000° C. It can be concluded that the energy produced during high speed drilling passes for the most part into the swarf and is evacuated by the swarf. In most cases, the workpieces are left rough as drilled. In contrast, for workpieces that are highly stressed, such as the rotors of turbojets, the holes as roughed out by the drilling process are subsequently subjected to finishing by conventional means. In any event, high speed drilling using the bit of the invention is profitable.

According to other characteristics of the invention, the helix angle of the flutes and of the lips preferably lies in the range 20° to 25° approximately, with the shaped portion of the bit having a taper angle equal to about 1°, each land having a width of less than about one-twentieth the outside diameter of the bit, a relief face extending from each cutting edge at an angle of less than 12° relative to a plane perpendicular to the axis of the bit, with said angle preferably being less than 8°, and an undercut face can also be formed extending in line with each relief face. Each cutting edge of the bit and the leading edge of each land, forming an intersection between each land and a main cutting face, is rounded with a radius lying in the range 2 μm to 40 μm approximately. The corners of the cutting edges may also be chamfered by about 0.5 millimeters (mm) at abut 20° relative to the axis of the bit. These additional characteristics serve to reduce the twisting and compression forces exerted on the ceramic bit. They also serve to reduce the heat energy produced while drilling at high speed while also improving dissipation of said energy via the swarf.

According to another advantageous characteristic, the apex angle of the bit, corresponding to the angle formed between the two main cutting edges, lies in the range 140° to 155° approximately. This characteristic allows the bit to be self-centering, and consequently avoids a pointing operation for centering the bit.

According to yet other characteristics of the bit of the invention:

each land is of a width lying in the range 0.2 mm to 0.8 mm, and preferably in the range 0.4 mm to 0.8 mm;

the shank and the shaped portion of the bit are made of ceramic;

the ceramic is based on alumina, zirconia, silicon nitride, or a mixture of ceramics;

the ceramic is reinforced by silicon carbide (SiC) fibers; and the bit is adapted to drilling refractory materials such as, for example, aviation materials based on nickel or based on cobalt, and possibly being, in particular an Inconel 718 having a Vickers hardness number of about 440 (HV).

The invention also provides a method of drilling by means of a ceramic bit of the type described above, wherein for high speed drilling in refractory aviation materials based on cobalt and nickel, the peripheral cutting speed of the bit lies in the range 400 m/min to 1000 m/min approximately, and the speed of advance of the bit lies in the range 0.04 to 0.1 millimeters per revolution. These ranges determine the conditions in which it is possible to use the ceramic bit of the invention without risk of accelerated wear or breakage of the bit, while enabling swarf to be evacuated well, and providing good heat dissipation via the swarf. For optimum conditions of use, the peripheral cutting speed of the bit lies in the range 400 m/min to 600 m/min approximately.

According to other characteristics of the method of the invention, drilling is performed dry without lubrication and does not require a prior pointing operation for centering the drill.

It is not recommended to use lubrication when drilling with a bit of the invention since that reduces the performance of the bit in terms of cutting parameters and lifetime.

Depending on the required final surface state, a single drilling operation without a prior pointing operation and without a subsequent finishing operation can suffice for making the final hole. Because the drilling speed is high and because the number of drilling operations is reduced, the bit of the invention makes it possible to reduce considerably the time required for drilling very hard materials. Compared with prior art bits which do not enable drilling to be performed in very hard materials at speeds that are as high as those made possible by the bit of the invention, the duration of a drilling operation in accordance with the invention is divided by at least 5.

According to other characteristics of the invention:

the method is adapted to drilling refractory materials such as, for example, aviation materials based on nickel or based on cobalt, and possibly being in particular an Inconel 718 having a Vickers hardness number of about 440 (HV);

the drilling constitutes a roughing operation.

BRIEF DESCRIPTION OF THE DRAWINGS

The invention will be better understood and other characteristics, details, and advantages thereof will appear more clearly on reading the following description made by way of example with reference to the accompanying drawings, in which.

MORE DETAILED DESCRIPTION

Figure 1:
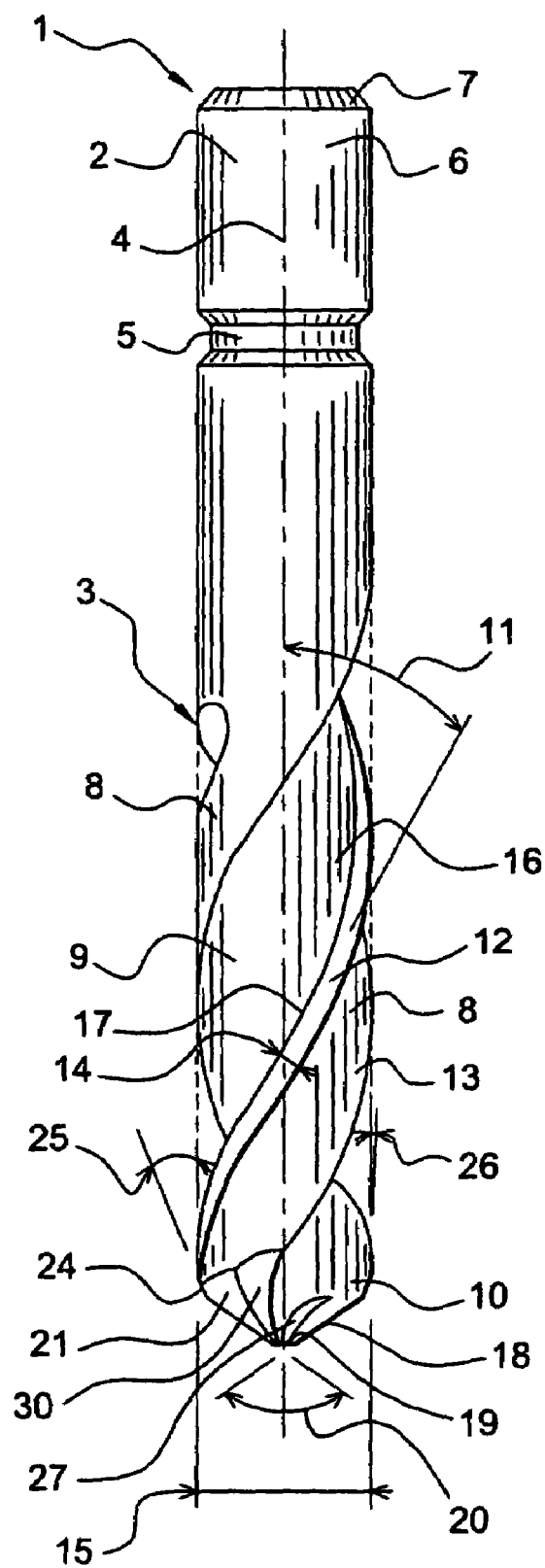
FIG. 1 is a diagrammatic side view of a drill bit of the invention.
Figure 2:
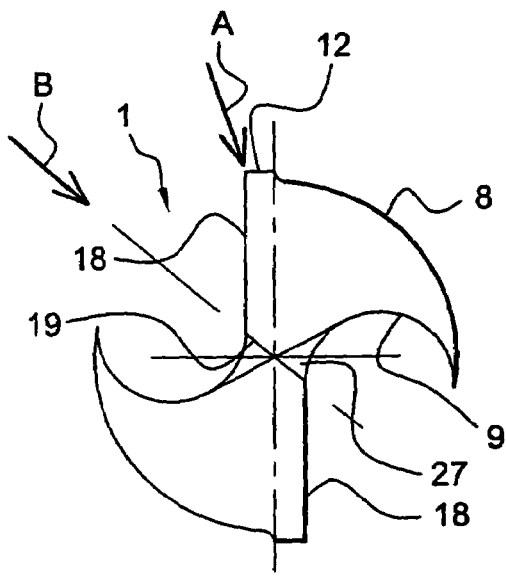
FIG. 2 is a diagrammatic leading end view of the bit shown in FIG. 1.
Figure 3:
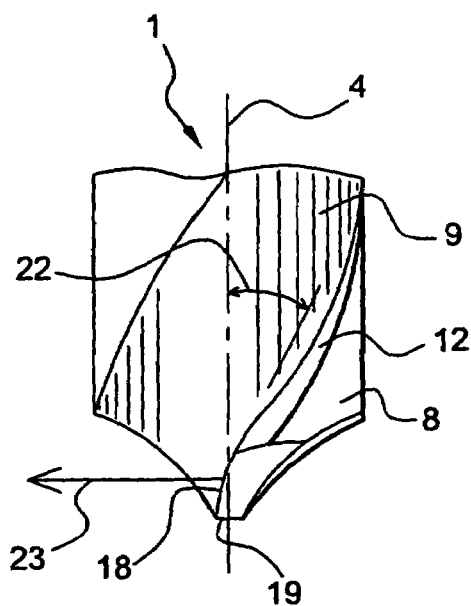
FIG. 3 is a side view of a portion of the FIG. 1 bit, seen looking along direction A in FIG. 2.
Figure 4:
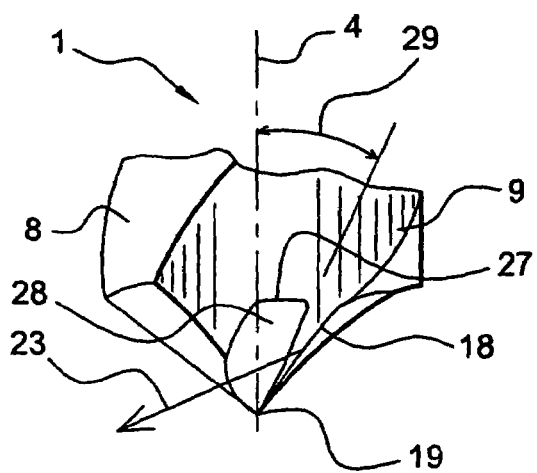
FIG. 4 is a side view of a portion of the FIG. 1 bit, seen looking along direction B in FIG. 2.

By way of example, FIGS. 1 to 4 show a one-piece ceramic drill bit for high speed drilling in materials of very great hardness, such as refractory aviation materials made of superalloys, and in particular of Inconel 718.

This ceramic bit 1 comprises (FIG. 1) a cylindrical shank 2 and a shaped portion 3 extending from the shank along the axis 4 of the bit. The shank includes an annular groove 5 for use in gripping the bit in the chuck of a machine tool (not shown). The free end 6 of the axial cylindrical shank is terminated by a chamfer 7 to facilitate inserting it into the chuck of the machine tool.

The shaped portion 3 of the bit 1 comprises two lips 8 and two flutes 9 extending in alternation around the axis 4 from the axial end 10 of the bit 1 that is remote from the shank 2, and referred to as the "tip" of the bit. The lips 8 and the flutes 9 wind helically around the axis 4 with a helix angle 11 that is less than or equal to 25°, approximately.

Each lip 8 comprises a land 12 for sliding against the inside wall of a hole to be drilled, and a clearance surface 13 that are both of helical shape. According to the invention, each land 12 is of width 14 that is less than or equal to about one-tenth the diameter 15 of the shaped portion 3 of the bit 1. Each flute 9 includes a main cutting face 16, adjacent to a land 12. The intersection between the land 12 and the main cutting face 16 forms an edge referred to as the leading edge 17 of the land 12.

Each land 12 is extended beside the tip 10 of the bit 1 by a main cutting edge 18. The main two cutting edges are separated by a central edge 19. The apex angle 20 formed between the two main cutting edges lies in the range 140° to 155° approximately. Each main cutting edge 18 is formed by the intersection between a main cutting face 16 of a flute 9 and a relief face 21 at an angle of less than about 10° relative to a plane perpendicular to the axis 4 of the bit. Each relief face 21 extends from a main cutting edge 18 with a relief angle lying in the range 4° to 10° approximately, and preferably lying in the range 6° to 8° approximately, relative to a plane perpendicular to the axis 4 of the bit 1. A positive or negative cutting angle is determined by the orientation of the cutting face 16 relative to the cutting direction 23: when the cutting face is inclined from the cutting edge towards the cutting direction 23, then the cutting angle is said to be negative, and conversely when the cutting face 16 is inclined from the cutting edge away from the cutting direction 23, then the cutting angle 22 is said to be positive.

Each corner 24 of the bit, constituted by an intersection between the main cutting edge 18 and the leading edge 17 of a land 12, includes a chamfer 25 of about 0.5 mm and at 20° approximately relative to the axis 4 of the bit.

The shaped portion 3 of the bit 1 has an overall outside shape that is in the form of a truncated cone. The larger base of the truncated cone is situated close to the tip 10, and the taper angle 26 of the shaped portion 3 lies in the range 1° to 3° approximately.

Two secondary cutting faces 28 formed by making two notches 27 (FIGS. 1, 2, and 4) extend from the central edge 19 of the bit 1 at a positive cutting angle 29 (FIG. 4) lying in the range 1° to 7° approximately relative to the axis 4 of the bit. The central edge 19 of the invention thus includes two secondary cutting edges.

The main and secondary cutting edges 18 and 19 of the bit 1, and the leading edge 17 of each land 12 are rounded with a radius lying in the range 2 μm to 40 μm.

The ceramic material constituting the one-piece bit 1 is based on alumina reinforced with silicon carbide (SiC) fibers.

In a variant embodiment of the bit 1 of the invention, the ceramic material may be based on zirconia, on silicon nitride, or on a mixture of ceramics, where the mixture is made up of zirconia and silicon nitride, optionally reinforced by silicon carbide fibers.

In another variant embodiment, the shaped portion 3 and the shank 2 of the bit 1 are two elements that are made separately, being made of different materials, and being bonded together, for example, by brazing. The shaped portion 3 of the bit 1 is then made of ceramic while the shank 2 of the bit 1 is made of a material having greater strength than the ceramic in order to withstand better the forces that are applied to the bit 1. By way of example, the material of the shank 2 of the bit 1 may be a tungsten carbide.

In order to improve the performance of the bit 1 of the invention, the helix angle 11 preferably lies in the range 20° to 25° approximately, the shaped portion 3 has a taper angle 26 equal to about 1°, each land 12 is of width 14 that is less than about one-twentieth of the outside diameter 15 of the shaped portion 3, each relief face 21 has an angle of about 8° relative to a plane perpendicular to the axis 4 of the bit 1, and each relief face 21 can also be extended by an undercut face 30.

In a variant embodiment of the bit 1 of the invention, the width 14 of each land 12 is equal to about 0.5 mm.

The ceramic bit 1 of the invention is particularly well adapted to drilling refractory materials such as refractory aviation materials based on nickel or on cobalt and commonly referred to as "superalloys". For example, it is possible to drill at very high speed into Inconel 718 having a Vickers hardness number of about 440. In the invention, the peripheral cutting speed of the bit lies in the range 400 m/min to 1000 m/min approximately and the speed of advance lies in the range 0.04 to 0.1 millimeters per revolution approximately when drilling in materials as hard as Inconel 718, thus making it possible to reduce considerably the stresses acting on the bit 1, both thermally and mechanically, in terms of twisting and compression forces. At these speeds, thermal stresses are reduced by providing heat dissipation via the swarf which quickly carries this heat energy away from the drill hole. For optimum conditions of use, the peripheral cutting speed of the drill should lie in the range 400 m/min to 600 m/min approximately. Using the bit outside the recommended range of speeds leads to accelerated wear of the bit.

According to another characteristic of the invention, drilling is performed dry without lubrication and constitutes a roughing operation that does not require any prior pointing operation for the purpose of centering the bit.

Depending on the required final surface state, a single drilling operation without any prior pointing operation and without any subsequent finishing operation can suffice for making the final hole.

What is claimed is:

1. A ceramic drill bit comprising:
   a cylindrical shank; and
   a shaped portion extending axially in line with the shank and having a free end forming the tip of the bit, the shaped portion being in the form of a truncated cone whose larger base is situated beside the tip of the bit,
   the tip comprising two main cutting edges and a central edge between the two main cutting edges, the shaped portion comprising two lips and two flutes extending in alternation around the axis of rotation of the bit, the lips and the flutes extending from the tip towards the shank, each lip including a land and each flute including a main cutting face adjacent to a land and to a main cutting edge, at least the shaped portion of the bit being made of ceramic material, the drill bit being wherein:
   the cutting angle of the bit is positive;
   a relief face extends from each main cutting edge at a relief angle lying in the range 4° to 10° approximately relative to a plane perpendicular to the axis of rotation of the bit; and
   two notches forming two secondary cutting faces extend from the central edge with positive cutting angles lying in the range 1° to 7° approximately relative to the axis of rotation of the bit; and
   wherein the taper angle of the shaped portion lies in the range 1° to 5° approximately.

2. A ceramic bit according to claim 1, wherein the lips and the flutes wind helically about the axis of rotation of the bit with a helix angle lying in the range 20° to 30° approximately relative to the axis of the bit.

3. A ceramic bit according to claim 2, wherein the helix angle lies in the range 20° to 25° approximately.

4. A ceramic bit according to claim 1, wherein the taper angle of the shaped portion lies in the range 2° to 4° approximately.

5. A ceramic bit according to claim 1, wherein the width of each land lies in the range 0.2 mm to 0.8 mm.

6. A ceramic bit according to claim 5, wherein the width of each land lies in the range 0.4 mm to 0.8 mm.

7. A ceramic bit according to claim 1, wherein each land is of width less than or equal to about one-twentieth of the outside diameter of the bit.

8. A ceramic bit according to claim 1, wherein the relief angle lies in the range 6° to 8° relative to a plane perpendicular to the axis of rotation of the bit.

9. A ceramic bit according to claim 1, wherein each relief face is extended by an undercut face.

10. A ceramic bit according to claim 1, wherein each main cutting edge of the bit and the leading edge of each land forming an intersection with each land and a cutting face is rounded with a radius lying in the range 2 μm to 40 μm approximately.

11. A ceramic tip according to claim 1, wherein the angles of the bit include respective chamfers of about 0.5 mm at about 20° relative to the axis of the bit.

12. A ceramic bit according to claim 1, wherein the apex angle of the bit corresponding to the angle formed by the two main cutting edges lies in the range 140° to 155° approximately.

13. A ceramic bit according to claim 1, wherein the shank and the shaped portion of the bit are made of ceramic.

14. A ceramic tip according to claim 1, wherein the ceramic material is based on alumina, on zirconia, on silicon nitride, or on a mixture of ceramics.

15. A ceramic bit according to claim 1, wherein the ceramic material is reinforced by silicon carbide fibers.

16. A method of drilling a material, said method comprising a step of drilling with a ceramic bit described in claim 1, wherein said step of drilling is performed with a peripheral cutting speed of the ceramic bit which lies in a range of 400 m/min to 1000 m/min approximately, and wherein said step of drilling is performed with a speed of advance of the ceramic bit which lies in a range 0.04 to 0.1 millimeters per revolution.

17. A drilling method according to claim 16, wherein the peripheral cutting speed of the bit lies in the range 400 m/min to 600 m/min approximately.

18. A drilling method according to claim 16, wherein drilling is performed dry.

19. A drilling method according to claim 16, wherein drilling is a roughing operation that does not require prior centering.

20. A drilling method according to claim 16, wherein a single drilling operation is needed to make the final hole.

21. A drilling method according to claim 16, wherein the drilling depth is greater than the diameter of the shaped portion of the bit.

22. A drilling method according to claim 16, wherein said step of drilling is performed on a refractory material.

* * * * *